United States Patent
Legatt et al.

[19]

[11] Patent Number: 6,148,476
[45] Date of Patent: Nov. 21, 2000

[54] FLOOR SURFACE CLEANING MACHINE

[75] Inventors: Donald Joseph Legatt, St. Michael; Kurt M. Vetse, Plymouth; Galen M. Swenson, Maple Grove, all of Minn.

[73] Assignee: Nilfisk-Advance, Inc., Plymouth, Minn.

[21] Appl. No.: 09/179,764

[22] Filed: Oct. 27, 1998

Related U.S. Application Data

[62] Division of application No. 08/731,658, Oct. 17, 1996, Pat. No. 5,829,095.

[51] Int. Cl.$^7$ .......................................................... A47L 5/26
[52] U.S. Cl. .................................. 15/385; 15/50.1; 15/87; 15/401
[58] Field of Search ...................................... 15/49.1, 50.1, 15/87, 385

[56] References Cited

U.S. PATENT DOCUMENTS

| | | | |
|---|---|---|---|
| 2,624,896 | 1/1953 | Atkin | 15/49.1 X |
| 2,969,557 | 1/1961 | Ptersen | 15/50.1 |
| 2,978,719 | 4/1961 | Arones . | |
| 3,790,981 | 2/1974 | Young | 15/87 |
| 3,825,968 | 7/1974 | Larsen | 15/87 |
| 3,866,541 | 2/1975 | O'Connor et al. | 15/50.1 |
| 4,042,762 | 8/1977 | Hakarine . | |
| 4,114,231 | 9/1978 | Nauta . | |
| 4,251,896 | 2/1981 | Block . | |
| 4,272,142 | 6/1981 | Zapf . | |
| 4,349,774 | 9/1982 | Farque . | |

(List continued on next page.)

FOREIGN PATENT DOCUMENTS 1082350  9/1967  United Kingdom ........................ 15/87

OTHER PUBLICATIONS

170 Automatic Floor Scrubber Battery w/Pump, Model: MC17500–00, Minuteman®, Revised Sep. 1993.

Clarke® Family Of . . . Large Automatics, Clarke Industries, Inc., St. Louis, Missouri, Rev. Mar. 1991.

The Force for Cleaning, gansow GmbH+Co. KG, Maschinenbau, Oct. 1991.

Advance Parts List, Retriever, Model 5800B, ©1988, Form No. 042179.

Advance Parts List, Convertamatic 17B, 20B, 20E, Models 386200, 386002, 386000, 386008, ©1989, Form No. 042209.

Advance Parts List, Convertamatic™260B, Hydro–Retriever™ 260BHD, Revised Apr. 1996, Form No. 042307.

Advance Parts List, Convertamatic™ 240 LX, LX–J, Hydro–Retriever™ 240 HD, Revised Sep. 1996, Form No. 042270.

*Primary Examiner*—Chris K. Moore
*Attorney, Agent, or Firm*—Alan Kamrath

[57] ABSTRACT

A floor scrubber (10) is disclosed including a drive lug (62) for removably connecting a scrubbing member (64) to a drive (60) and having a trough for receipt and catching of solution for passage to the surface. The mount (58) for the drive (60) is biased by a spring (67) to pivot relative to a linkage plate (46) in turn pivotably mounted to the chassis (12) at an acute angle to the forward movement direction. The vacuum assembly (92) is sandwiched in a socket (100) formed in the bottom wall of a recovery tank (90) by a mount (106) to deaden the sound generated thereby and to allow air communication inside of the socket (100) but generally preventing entry of solution therein. The squeegee assembly (152) is biased by a gas spring (150) to engage the surface at a constant force independent of the pivotal position of the squeegee mount (148). The batteries (68, 70) can be easily electrically connected and disconnected to each other in series and to the scrubber (10) by polarity type connectors (80, 82, 84, 86) for ease of removal, replacement, and interchange of the batteries (68, 70) in the scrubber (10) without requiring the use of tools. The bumper wheels (30) are secured to a first plate (32) of a pocket (28) by a pin connector (36) passing therethrough and through the legs of a U-shaped bracket (42) having a central portion flushly abutting with a second plate (38) of the pocket (28) for transferring forces thereto.

15 Claims, 7 Drawing Sheets

U.S. PATENT DOCUMENTS

| | | | |
|---|---|---|---|
| 4,368,554 | 1/1983 | Mealing et al. | 15/87 R |
| 4,424,264 | 1/1984 | McGuire et al. . | |
| 4,490,873 | 1/1985 | Sratton | 15/50.1 |
| 4,691,402 | 9/1987 | Veselka | 15/87 |
| 4,731,956 | 3/1988 | Wood | 15/49.1 X |
| 4,906,205 | 3/1990 | Viles . | |
| 4,969,834 | 11/1990 | Johnson . | |
| 5,369,838 | 12/1994 | Wood et al. . | |
| 5,377,376 | 1/1995 | Wood et al. . | |
| 5,432,019 | 7/1995 | Hue . | |
| 5,455,982 | 10/1995 | Armstong et al. . | |

FLOOR SURFACE CLEANING MACHINE

CROSS REFERENCE

The present application is a division of Ser. No. 08/731,658 filed Oct. 17, 1996, now U.S. Pat. No. 5,829,095.

BACKGROUND

The present invention generally relates to surface cleaning machines, particularly to floor surface cleaning machines, and specifically to floor surface scrubbers.

A floor scrubber is a commonly used piece of equipment in the floor-care industry. The machine is generally comprised of a tank to hold cleaning solution, a scrub system to agitate the solution on the floor surface in order to loosen dirt, a vacuum squeegee system to pick up the dirty solution, and a tank to contain the dirty solution. Often floor scrubbers are battery powered.

As set forth in at least U.S. Pat. No. 2,978,719, floor surface cleaning members can be arranged to engage the floor surface in a manner to not only treat the floor surface but also provide a propelling force. In particular, floor surface scrubbers often arranged a single rotating floor scrubbing member to be mounted at an angle to the forward direction of travel of the floor scrubber to counter torque steer from the floor scrubbing member and to provide such a propelling force for assisting the operator in moving the floor scrubber over the floor surface. However, while enhancing the propelling force generated, such mounting often sacrificed the size of the pattern which the floor scrubbing member engaged the floor, especially for uneven floors.

Additionally, cleaning solution was often shower fed on the back of the rotating floor scrubbing member in floor scrubbers where the floor scrubbing member was directly driven by a motor or a motor/gear box combination. The back of the floor scrubbing members included holes which supposedly allowed the solution to flow therethrough to the scrubbing portions and the floor surface. However, due to rotation of the floor scrubbing members, the solution was accelerated when it engaged the back of the floor scrubbing member and tended to travel outwardly beyond the periphery of the floor scrubbing member and even in a manner to engage the side floor wipers. It is desired that the scrubbing member work the solution for as long as possible against the floor surface. To maximize operational efficiency, it is desired to provide the solution in the center of the scrubbing member to maximize the distance for the solution to travel to reach the periphery of the scrubbing member. Although annular dams have been provided on the back of the scrubbing member, the force that the solution is thrown outward by its engagement with a rotating scrubbing member is often sufficient to allow the solution to flow over such dams. Although allowing solution through the lug to which the scrubbing member is removably secured has been utilized for larger, generally indirectly driven scrubbing members where the scrubbing members are secured to the lug by uprights or similar fasteners, solution flow through lugs having radially extending, circumferentially spaced ears has not been provided.

For optimal operation, squeegees must engage the floor surface with an operational force. Although springs can be utilized to provide a biasing force for squeegees, such biasing force varies when the squeegee changes position relative to the floor scrubber as it moves over uneven floors. Although utilizing dead weight on the squeegee provides constant operational force, such squeegees are bulky and otherwise disadvantageous.

As floor scrubbers are often utilized in environments where noise is not desirable such as in hospitals, suitable provisions must be made to deaden any sound generated by the floor scrubber. As floor scrubbers utilize solution and are often cleaned by spraying down with water, it is desired that electrical motors and other electrical components to which water and similar solutions may have a detrimental affect be located in environments which allow passage of air but generally prevent passage of solutions.

To reduce fabrication and assembly costs, the use of plastic components in floor scrubbers is increasing. However, plastic components do not have the ability to absorb forces that many metal components do. As an example, bumper wheels which are secured by axially extending fasteners will create excessive torque force on plastic components from which the fasteners extend.

As the floor scrubbing members are located on the underside of floor scrubbers, it is often necessary to tip the floor scrubber to gain access to the scrubbing members such as for servicing or replacement. For battery powered floor scrubbers, tipping of the batteries may be detrimental to the batteries themselves and may be difficult due to their relatively large mass. In addition, to extend operation of the floor scrubber and not requiring delay while discharged batteries are being recharged, it is desirable to replace the discharged batteries with replacement, charged batteries to allow operation of the floor scrubber while the discharged batteries are being recharged. Thus, the batteries are often removed from the floor scrubbers. Typically, two 12 volt batteries are connected in series. Thus, a need exists for easily electrically connecting and disconnecting the batteries to each other and to the floor scrubber without requiring the use of tools and for allowing ease of removal, replacement, and interchange of batteries in floor surface cleaning machines.

Thus, a need exists for surface cleaning machines which overcome these deficiencies in prior surface cleaning machines, which satisfy needs in the field of surface cleaning machines, and which are otherwise advantageous.

SUMMARY

The present invention solves these needs and other problems in the field of surface cleaning machines by providing, in the preferred form, biasing of a mount for the drive of a floor surface treating member to pivot relative to a linkage plate in a direction to move the portion of the floor surface treating member opposite to the linkage plate towards the floor surface, with the linkage plate being pivotably mounted to the chassis at an acute angle to the forward movement direction.

In other aspects of the present invention, a drive lug has a plurality of ears radially extending from a cylindrical portion secured to a hub portion and has openings therebetween for passage of solution, with a trough defined between the cylindrical and hub portions for receipt and catching of the solution for passage through the openings.

In still other aspects of the present invention, a gas spring biases the engagement of the provisions for picking up solution against the surface at a constant force whether or not the surface is even.

In further aspects of the present invention, the vacuum assembly is sandwiched in a socket when a mount is removably secured to the socket. The vacuum assembly includes an inlet passing through a wall of the socket in a sealed manner and an outlet passing through the open end of the socket. In the preferred form, air communication is provided into and out of the socket while generally preventing entry of solutions into the socket.

In still further aspects of the present invention, a bumper wheel is secured by a fastener extending through first and second legs of a bracket and the bumper wheel and secured to a first plate of a pocket, with the central portion of the bracket flushly abutting with a second plate of the pocket for transferring forces thereto in the event that the bumper wheel engages an obstacle.

Also, in other aspects of the present invention, first and second batteries are connected in series by electrical connectors and to a harness connector so that the batteries can be easily electrically connected and disconnected to each other and to the surface cleaning machine without the use of tools for ease of removal, replacement, and interchange of the batteries in the surface cleaning machine.

It is thus an object of the present invention to provide a novel surface cleaning machine.

It is further an object of the present invention to provide such a novel surface cleaning machine biasing a surface treating member which provides a propelling force for assisting forward movement of the surface cleaning machine and which provides torque steer neutralization.

It is further an object of the present invention to provide such a novel surface cleaning machine biasing a surface treating member to maximize the size of its engagement pattern with the floor surface.

It is further an object of the present invention to provide such a novel surface cleaning machine having a drive lug including radially extending ears for removable securement of an annular scrubbing member and allowing passage of solution therethrough.

It is further an object of the present invention to provide such a novel surface cleaning machine having a drive lug including a trough for receipt and catching of solution for passage to the surface.

It is further an object of the present invention to provide such a novel surface cleaning machine biasing the provisions for picking up solution with a constant force against the surface independent of the position of the provisions.

It is further an object of the present invention to provide such a novel surface cleaning machine having the vacuum assembly sandwiched and without connectors inside of a socket.

It is further an object of the present invention to provide such a novel surface cleaning machine having the vacuum assembly in an environment where air is allowed to communicate but where solution is virtually prevented from entering.

It is further an object of the present invention to provide such a novel surface cleaning machine having the sound generated by the vacuum assembly deadened.

It is further an object of the present invention to provide such a novel surface cleaning machine having a reduced number of components and which is easy to assemble.

It is further an object of the present invention to provide such a novel surface cleaning machine where force transfer from the bumper wheels does not result in failure of its connection to a plastic component.

It is further an object of the present invention to provide such a novel surface cleaning machine where batteries connected in series can be easily electrically connected and disconnected to each other and to the surface cleaning machine without the use of tools.

It is further an object of the present invention to provide such a novel surface cleaning machine allowing ease of removal, replacement, and interchange of the batteries.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

Figure 1:
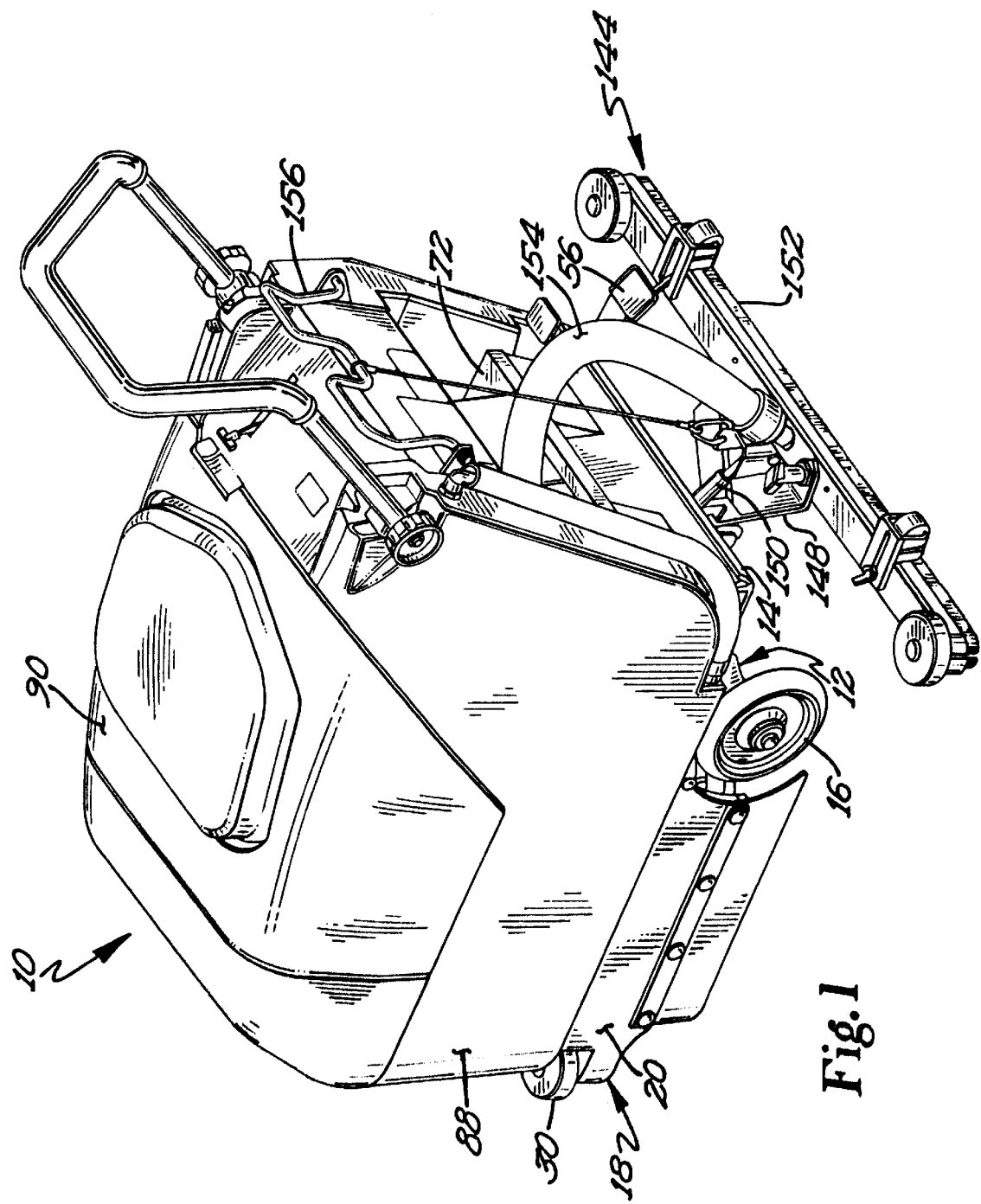
FIG. 1 shows a perspective view of a floor surface cleaning machine in the most preferred form of a floor scrubber according to the preferred teachings of the present invention.
Figure 2:
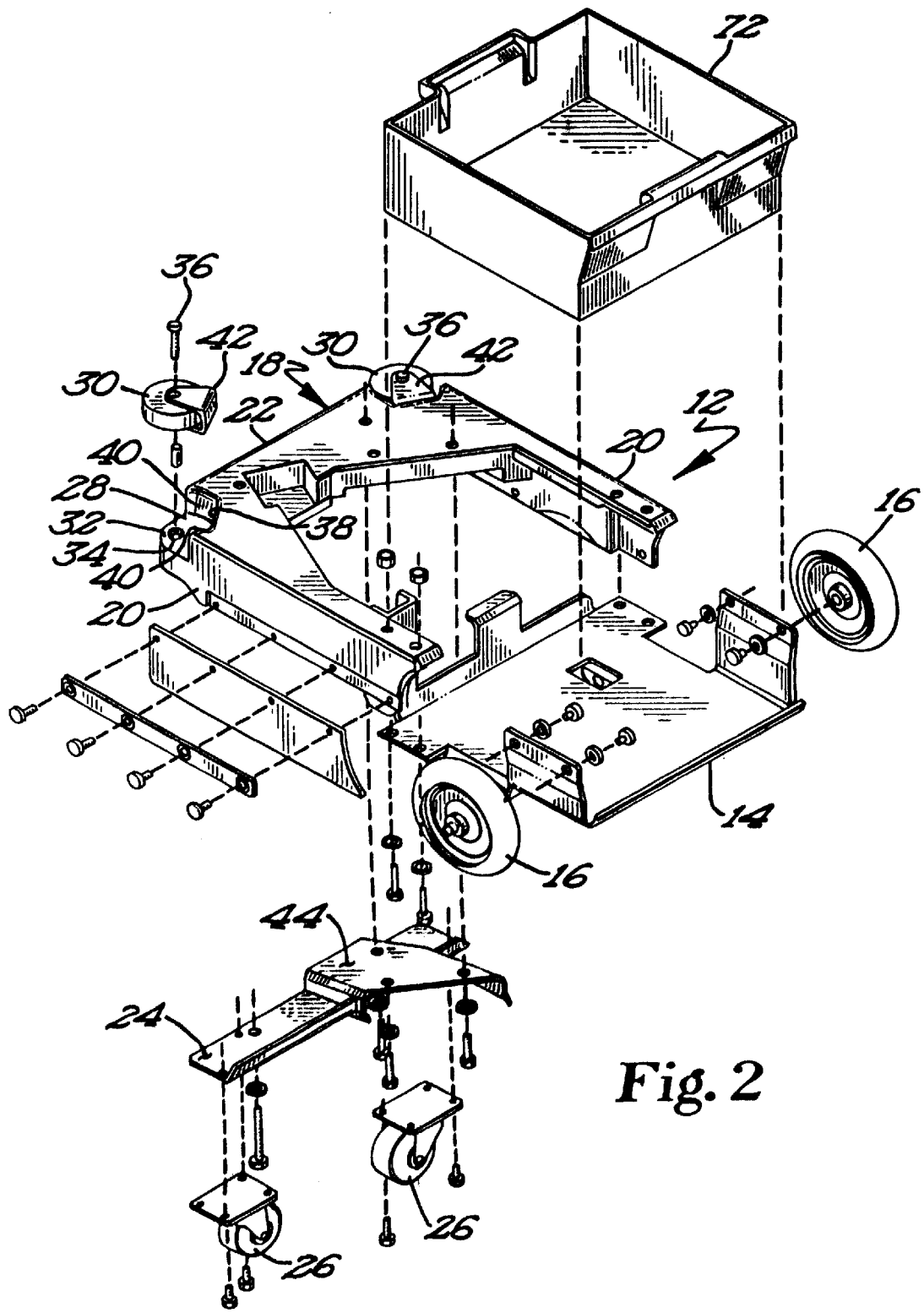
FIG. 2 shows an exploded, partial, perspective view of the floor scrubber of FIG. 1.
Figure 3:
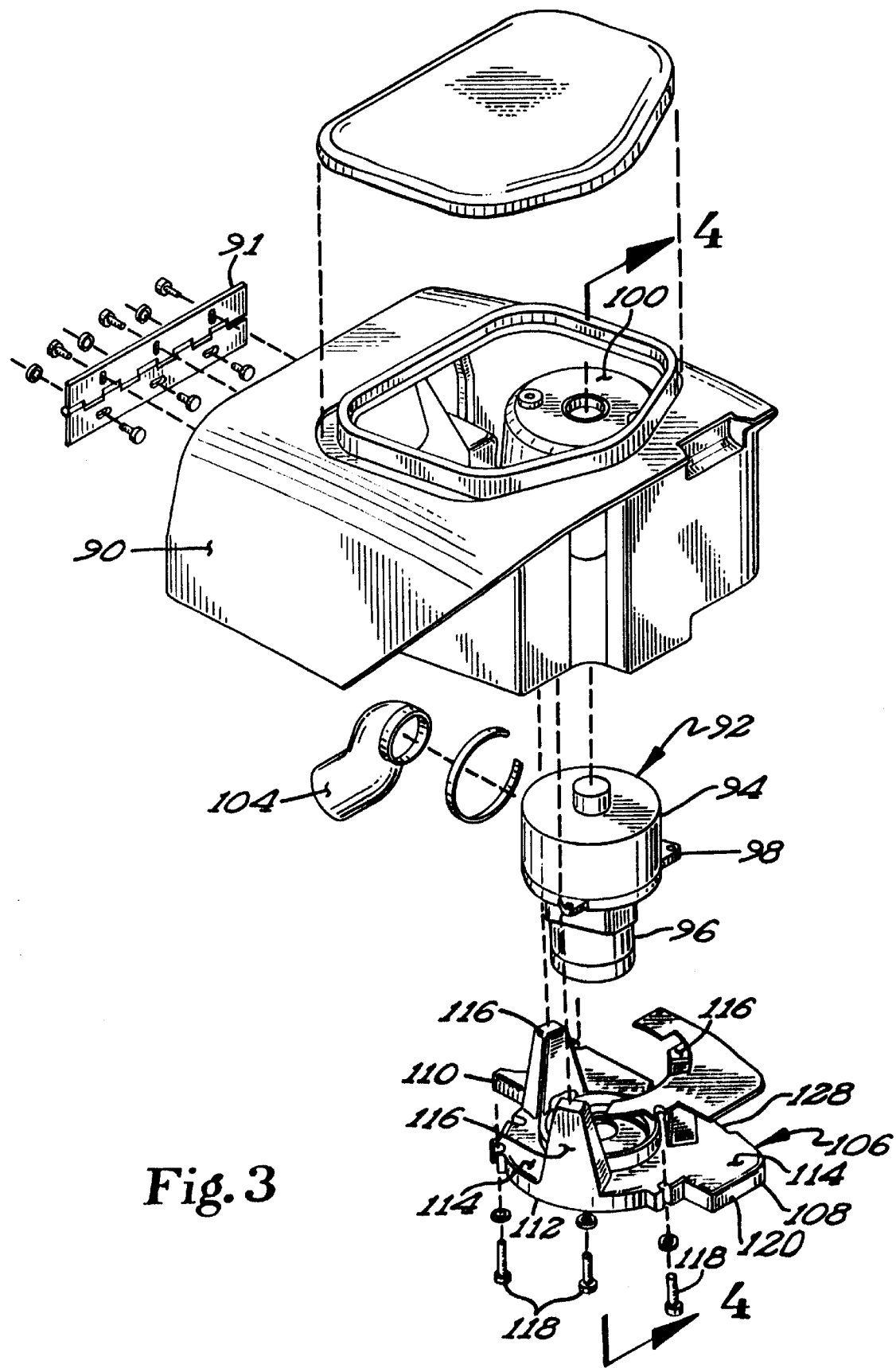
FIG. 3 shows an exploded, partial, perspective view of the floor scrubber of FIG. 1.
Figure 4:
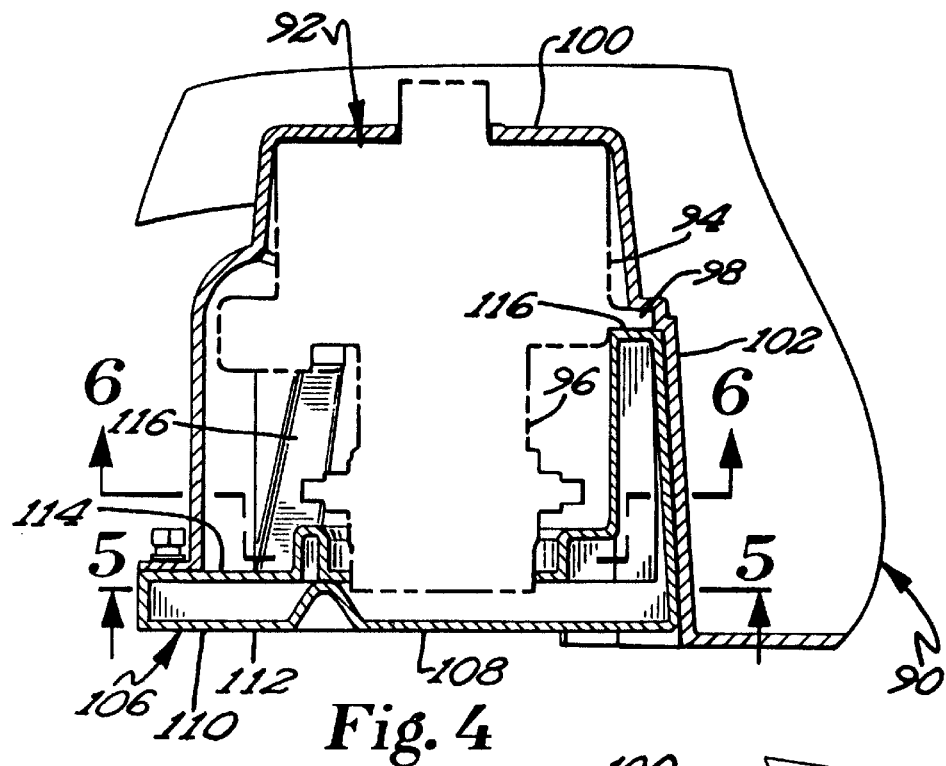
FIG. 4 shows a partial, cross-sectional view of the floor scrubber of FIG. 1 according to section line 4—4 of FIG. 3.
Figure 5:
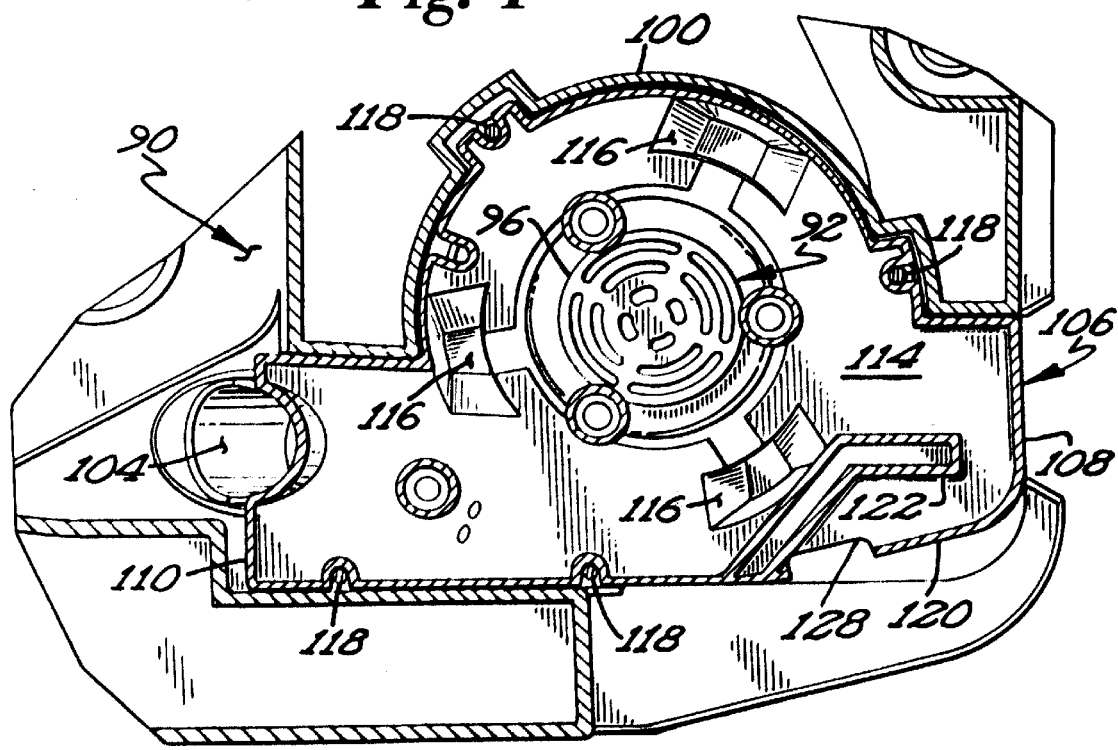
FIG. 5 shows a partial, cross-sectional view of the floor scrubber of FIG. 1 according to section line 5—5 of FIG. 4.
Figure 6:
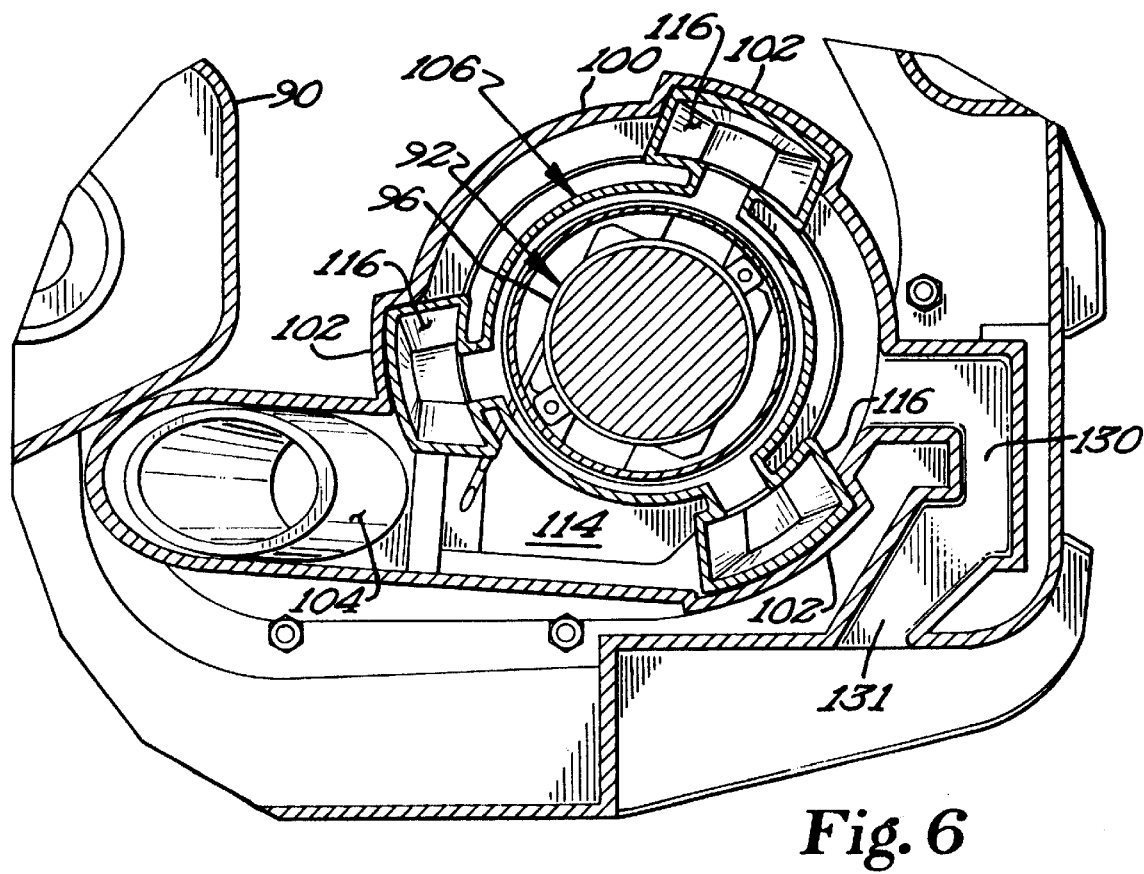
FIG. 6 shows a partial, cross-sectional view of the floor scrubber of FIG. 1 according to section line 6—6 of FIG. 4.
Figure 10:
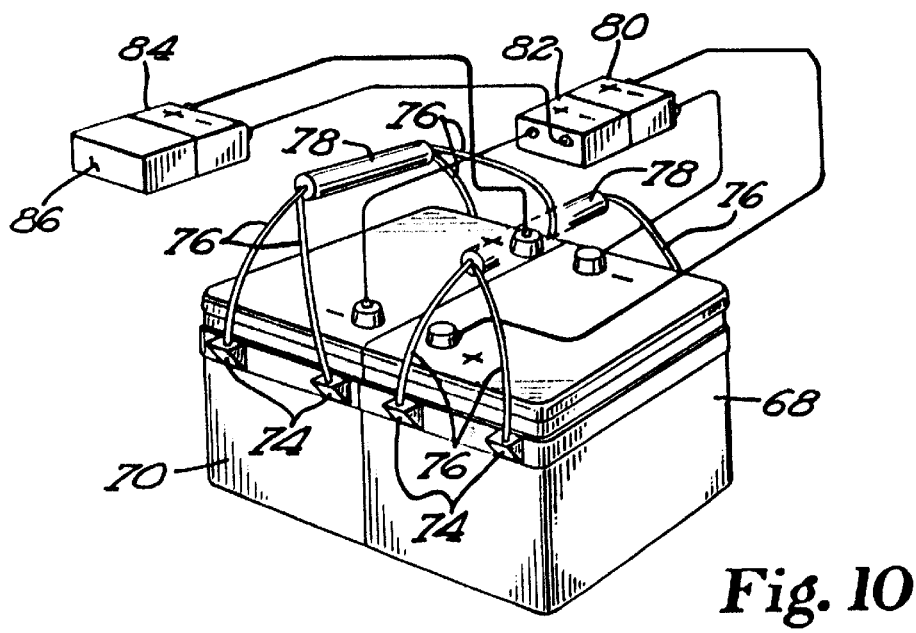
FIG. 10 shows a partial, diagrammatic view of the floor scrubber of FIG. 1, with portions shown in phantom.
Figure 7:
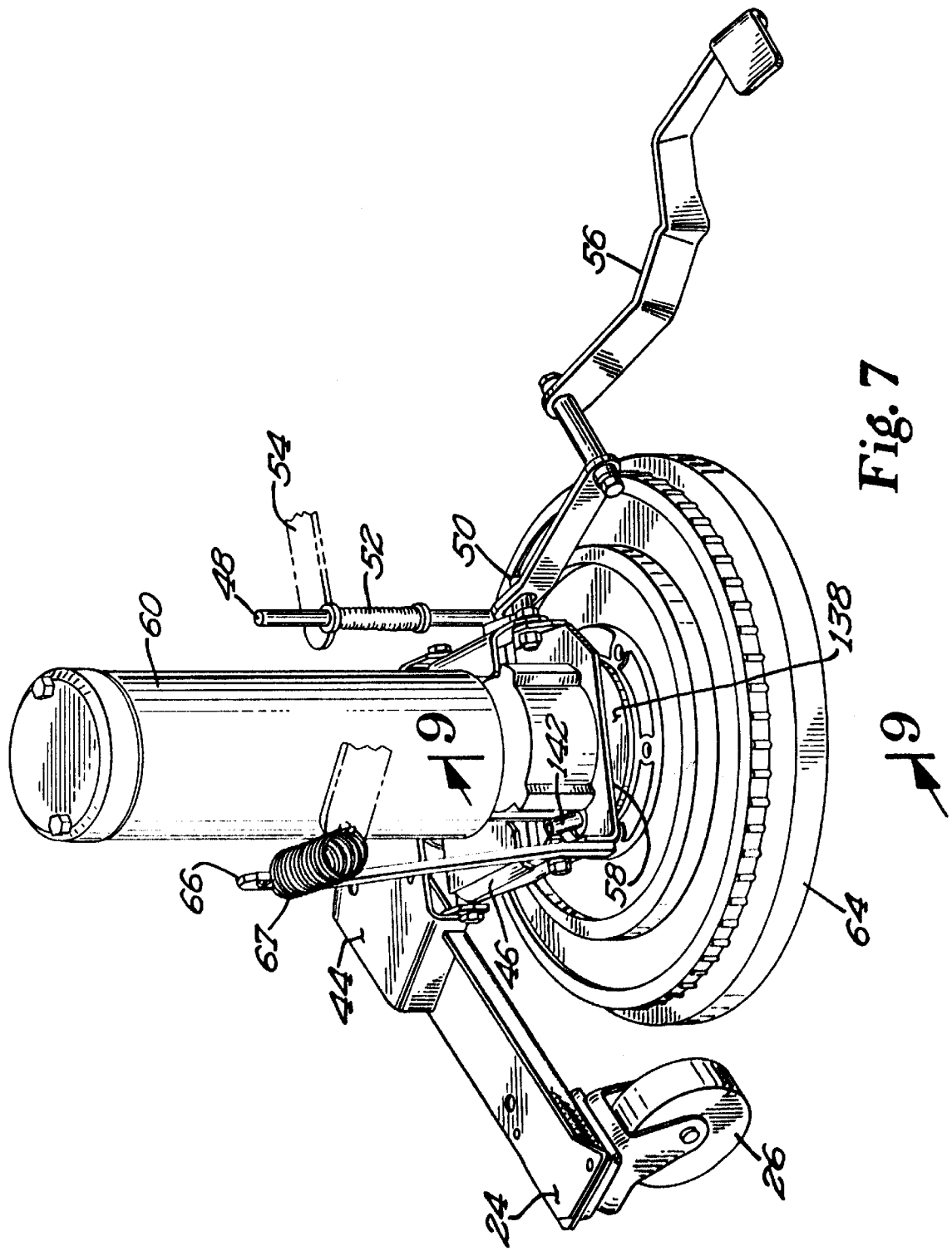
FIG. 7 shows a partial, perspective view of the floor scrubber of FIG. 1, with portions shown in phantom.
Figure 8:
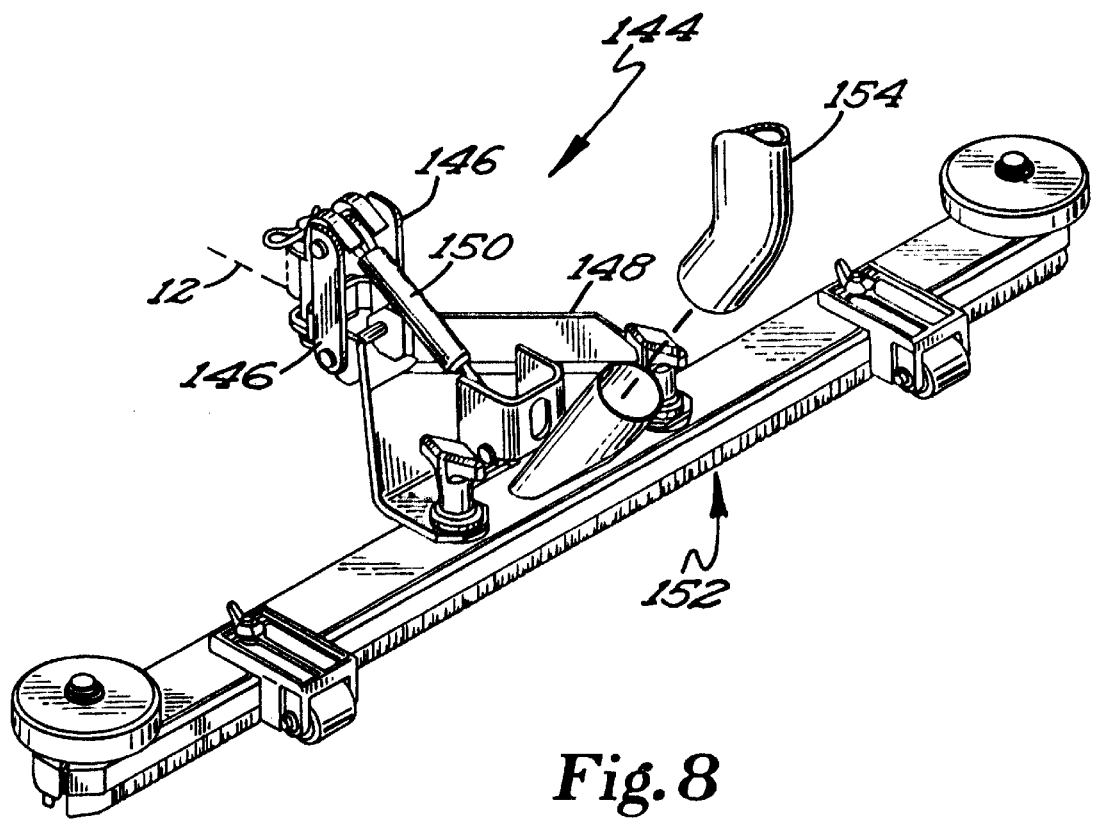
FIG. 8 shows a partial, exploded perspective view of the floor scrubber of FIG. 1, with portions shown in phantom.
Figure 9:
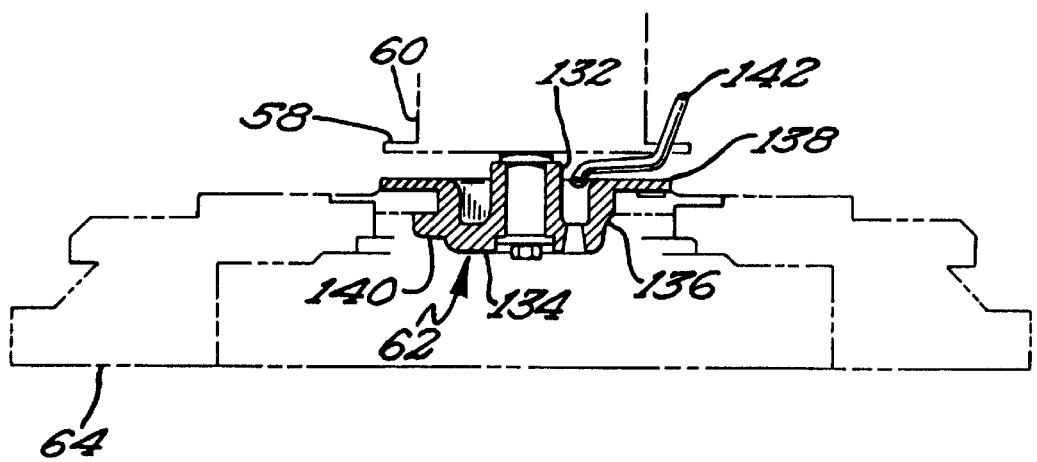
FIG. 9 shows a partial, cross-sectional view of the floor scrubber of FIG. 1, with portions shown in phantom.

All figures are drawn for ease of explanation of the basic teachings of the present invention only; the extensions of the Figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "top", "bottom", "first", "second", "front", "outer", "inner", "upper", "lower", "width", "length", "end", "side", "horizontal", "vertical", "axial", "radial", "forward", and similar terms are used herein, it should be understood that these terms have reference only to the structure shown in the drawings as it would appear to a person viewing the drawings and are utilized only to facilitate describing the illustrative embodiment.

DESCRIPTION

A floor surface cleaning machine according to the preferred teachings of the present invention is shown in the drawings in its most preferred form of a floor scrubber and generally designated 10. Generally, scrubber 10 includes a chassis 12 formed from a plurality of components. Specifically, chassis 12 includes a battery carrier 14 including a large planar surface and a pair of wheels 16 mounted thereto for rotation about a horizontal axis. In the most preferred form, carrier 14 is formed of metal. Chassis 12 further includes a generally U-shaped skirt 18 having first and second leg portions 20 extending from the opposite ends of a central front portion 22. The free ends of leg portions 20 are suitably secured to carrier 14 to thereby define a scrubbing opening between carrier 14 and skirt 18. In the most preferred form of the present invention, skirt 18 is molded from plastic. A caster mount 24 is suitably secured to skirt 18 and extends parallel to but spaced from the axis of wheels 16. In the preferred form, mount 24 is formed of metal. First and second casters 26 are suitably secured to mount 24. It should then be appreciated that chassis 12 and scrubber 10 is movably supported upon the floor surface by wheels 16 and casters 26. For purposes of explanation, forward movement of floor scrubber 10 will be defined as when scrubber 10 moves in a direction where wheels 16 rotate about their axis at the same speed and with casters 26 being forward of wheels 16.

The forward outside corners of skirt 18 include pockets 28 for receiving bumper wheels 30 and extending from the corners at the intersection of the front and side walls thereof. Pockets 28 each include a horizontal planar plate or surface 32 parallel to the floor surface and having a fastener 34 such as a nut embedded therein for threadable receipt of a pin connector 36. Each pocket 28 further includes a vertical planar plate or surface 38 extending generally perpendicular to surface 32 and the floor surface and at a nonparallel angle to the axis of wheels 16 and in the most preferred form at an angle in the order of 45° to the axis of wheels 16 and the forward movement direction. Pockets 28 each further include first and second side plates or surfaces 40 extending generally perpendicular to surface 32 and the floor surface and extending from the opposite edges of surface 38 to the front and side walls of skirt 18. A generally U-shaped bracket 42 is provided including first and second legs extending parallel to each other and from a central portion, with the legs being spaced generally equal to but slightly greater than the thickness of wheels 30. The central portion of bracket 42 has a shape for flushly abutting with surface 38 and is planar in the most preferred form. Wheels 30 are mounted by pin connector 36 extending through a vertical aperture in the first leg of bracket 42, through the axis of wheel 30, through a vertical aperture in the second leg of bracket 42 and secured to surface 32 and specifically into fastener 34. When wheels 30 are so mounted, the central portion of bracket 42 flushly abuts surface 38 free of connection and the peripheries of wheels 30 extend beyond the front and side walls of skirt 18. Side plates 40 generally follow the outer periphery of wheels 30 spaced from but closely adjacent thereto. Pin connectors 36 can slide through suitable bushings provided to insure free rotation of wheels 30 thereon.

It should be noted that if scrubber 10 should be moved too close to obstacles around the floor surface to be cleaned, wheels 30 engage such obstacles and act as bumpers and force scrubber 10 to move away therefrom. It should be appreciated that if wheels 30 should engage an obstacle, force is transferred to pin connector 36 which in turns transfers force to fastener 34 and surface 32 and also to bracket 42 which in turn transfers forces to vertical surface 38. It should then be noted that if bracket 42 was not provided, force transfer would generally be exclusively to fastener 34 and surface 32. With skirt 18 formed of plastic, force transfer to fastener 34 and surface 32 may result in failure thereof if excessive or over time. According to the preferred teachings of the present invention, bracket 42 is utilized to transfer forces over the large area of surface 38 and minimizes the force transfer to fastener 34 and surface 32 to allow fabrication of surface 32 from plastic. It should be noted that pin connector 36 is the sole and exclusive method of connection or securement of wheel 30 and bracket 42 to skirt 18 for reduction of the number of components and for ease of assembly.

Caster mount 24 includes an integral projection 44. A linkage plate 46 is pivotably mounted to projection 44 about a linkage axis which is at a nonparallel angle to the axis of wheels 16 and at an acute angle to the forward movement direction and specifically in the preferred form in the order of 30°. Linkage plate 46 is pivotable between a transport position and a scrubbing position and in the most preferred form is biased from the transport position towards the floor surface and scrubbing position. In the most preferred form, linkage plate 46 is biased by a rod 48 having its lower end pivotable about a pin 50 integrally extending from plate 46 generally parallel to and spaced from the pivot axis of linkage plate 46 to mount 24. Specifically, rod 48 includes a stop for sandwiching a spring 52 against an ear 54 in a fixed position relative to mount 24. A lift lever 56 is provided for moving linkage plate 46 against the bias of spring 52 from its scrubbing position to its transport position. In the most preferred form, lift lever 56 has a free end including an aperture slideably and pivotably received on pin 50 and is pivotably mounted about an axis which is spaced from and parallel to the axis of wheels 16. Lift lever 56 has suitable provisions for holding lift lever 56 in the desired pivotable position.

A motor mount 58 is pivotably mounted to linkage plate 46 about a mount axis which is parallel to but spaced from the linkage pivot axis of linkage plate 46 to caster mount 24. A suitable drive 60 such as a battery powered electric motor and a year box as shown is suitably mounted to motor mount 58. In the most preferred form, drive 60 is totally sealed to allow it to be sprayed or otherwise encounter water or other solutions without detriment. A drive lug 62 is suitably secured to the output shaft of drive 60 for rotation therewith. A suitable annular scrubbing member 64 such as a scrub brush is removably secured to drive lug 62.

According to the teachings of the present invention, motor mount 58 is biased by provisions (separate from the mass of drive 60, lug 62 and member 64) to pivot relative to linkage plate 46 such that the edge of motor mount 58 and of member 64 on the opposite side of the mount pivot axis than linkage plate 46 moves vertically downward and toward the floor surface and the edge of motor mount 58 and of member 64 adjacent to linkage plate 46 moves away from the floor surface. Specifically, an arm 66 integrally upstands from motor mount 58 adjacent its edge opposite linkage plate 46. A tension spring 67 extends in a plane generally perpendicular to and away from the pivot axis of motor mount 58 between the free end of arm 66 and an attachment point at a fixed position relative to caster mount 24. In the most preferred form, one end of tension spring 67 is received in a vertically elongated slot formed in the free end of arm 66 and having a plurality of horizontally extending and vertically spaced fingers. Thus, the tension force of spring 67 can be adjusted by positioning its end between different fingers of the elongated slot.

Due to its mounting at an angle to the forward movement direction, scrubbing member 64 provides torque steer neutralization and also a propelling force for assisting the operator in moving scrubber 10 over the floor surface in the forward movement direction. According to the preferred teachings of the present invention, the biasing of motor mount 58 by spring 67 maximizes the size of the pattern in which scrubbing member 64 engages the floor surface and in particular so that the pattern extends over substantially the full diametric width of scrubbing member 64 parallel to the axis of wheels 16 and includes approximately two-thirds of the total area of scrubbing member 64 in the most preferred form. Additionally, the biasing of linkage plate 46 by spring 52 maximizes the pressure with which scrubbing member 64 engages the floor surface. Further, the biasing provided by springs 52 and 67 maximizes the floor pattern size and pressure when the floor surface is not even.

In the preferred form, scrubber 10 is battery powered and specifically in the most preferred form includes first and second twelve volt batteries 68 and 70 positioned in a battery tray 72 which is slideably positionable upon carrier 14. For ease of handling, each battery 68 and 70 includes an integral handle extending over the tops of batteries 68 and 70. Specifically, in the most preferred form, each end of batteries 68 and 70 includes first and second lugs 74. First and second elongated flaccid straps 76 extend between the first and second lugs 74, respectively, on the opposite ends of batteries 68 and 70. In the most preferred form, straps 76 extend through a tube 78 having a length less than the distances between the ends of batteries 68 and 70. Thus, batteries 68 and 70 can be picked up and carried by grasping the handle formed by straps 76 between lugs 74 and in the most preferred form defined by tubes 78 in the hand.

In the most preferred form, a first polarity type connector 80 has its positive terminal connected to the positive terminal of battery 68 and its negative terminal connected to the negative terminal of battery 68. A second polarity type connector 82 is provided for removable electrical connection to connector 80. The positive terminal of connector 82 is connected to the negative terminal of battery 70. The negative terminal of connector 82 is connected to the negative terminal of a third polarity type connector 84. The positive terminal of connector 84 is electrically connected to the positive terminal of battery 70. Third connector 84 is removably electrically connected to a fourth polarity type connector 86 which is electrically connected to the wiring harness for scrubber 10 for powering drive 60 and other electrically powered components of scrubber 10. When electrically interconnected, batteries 68 and 70 are in series.

Scrubber 10 according to the preferred teachings of the present invention also generally includes a solution tank 88 of a generally annular shape. Tank 88 is suitably mounted to chassis 12 to surround and enclose the scrubbing mechanism including but not limited to drive 60 and scrubbing member 64 and battery tray 72. In the preferred form, the rear portion of solution tank 88 is elevated above carrier 14 to allow battery tray 72 to be slid horizontally onto carrier 14 and within the center of the annular shape of tank 88.

It should be appreciated that it is often desired to tip scrubber 10 to obtain underside access. Due to their weight and the undesirability of tipping batteries 68 and 70, it is desirable to remove batteries 68 and 70 from scrubber 10 before scrubber 10 is tipped. Also, to extend operation of scrubber 10, it is desirable to interchange discharged batteries 68 and 70 with replacement, charged batteries 68 and 70. Specifically, connectors 80 and 82 and connectors 84 and 86 can be separated from each without the use of tools. Thus, battery 68 with connector 80 electrically connected thereto and battery 70 with connectors 82 and 84 electrically connected thereto can be removed from scrubber 10 and specifically it is not necessary to remove the electrical connections of connectors 80, 82, and 84 to the terminals of batteries 68 and 70. Batteries 68 and 70 can then be lifted from tray 72 and carried to a position remote from scrubber 10 by grasping tubes 78. When it is desired to replace batteries 68 and 70 in scrubber 10, batteries 68 and 70 can be carried and lowered into tray 72 by grasping tubes 78. When in position in scrubber 10, connectors 80 and 82 and connectors 84 and 86 can be slid together and in electrical connection and without requiring the use of tools. It should be noted that due to their polarity type, connectors 80, 82, 84, and 86 can not be connected with their polarities reversed. Thus, it should be appreciated that batteries 68 and 70 can be easily separated from each other and from scrubber 10 according to the teachings of the present invention for allowing ease of removal, replacement, and interchange of batteries 68 and 70 in scrubber 10.

Scrubber 10 according to the preferred teachings of the present invention also generally includes a recovery tank 90 suitably mounted in the preferred form on solution tank 88. In the most preferred form, recovery tank 90 is mounted for pivotable movement relative to solution tank 88 and chassis 12 between an operative position covering the center of the annular shape of solution tank 88 and a service position allowing access to the center of the annular shape of tank 88. Specifically, in the most preferred form, the front edge of recovery tank 90 is suitably hingedly secured by a hinge 91 to the forward portion of solution tank 88. Recovery tank 90 is placed under a vacuum such as by a vacuum assembly 92. Specifically, vacuum assembly 92 includes an enclosed fan 94 having an inlet in fluid communication with the interior of recovery tank 90 and having an outlet. Fan 94 is rotated by a drive such as a battery powered electric motor 96 including an internal fan for moving cooling air. In the most preferred form, fan 94 includes circumferentially spaced and radially extending mounting ears 98 extending therefrom.

In the most preferred form, scrubber 10 includes provisions for enclosing assembly 92 for generally preventing water and other solutions from reaching motor 96 but allowing communication of air to and from fan 94 and to and from the internal fan of motor 96 and for deadening sound generated by assembly 92. In particular, the bottom wall of recovery tank 90 includes and defines an upstanding socket 100 of a size for slideably receiving assembly 92. The inlet of fan 94 passes and extends through and is suitably sealed with the top wall of socket 100 to generally prevent entry of solution into socket 100 around the inlet of fan 94. To maximize capacity, the inlet of fan 94 is located adjacent the top wall of tank 90. Socket 100 further includes a plurality of troughs 102 for slideably receiving ears 98 and terminating in shoulders against which ears 98 abut when inlet of fan 94 extends through the top wall of socket 100 and when fan 94 around its inlet is closely adjacent or abuts with the top wall of socket 100. The outlet of fan 94 includes a vacuum exhaust hose 104 which in the preferred form includes suitable sound reduction provisions and which extends from fan 94 inside of socket 100 and passes through the open end of socket 100 in communication with the center of the annular shape of solution tank 88.

Scrubber 10 further includes an assembly mount 106 of a generally hollow construction and of a size for closing the lower, open end of socket 100 in a sealed manner to generally prevent entry of solution into socket 100 through its open end and around hose 104. Specifically, mount 106 includes a base 108 of a size and shape for closing the lower end of socket 100. In the preferred form, base 108 is generally circular in shape and includes provisions 110 extending generally tangentially from the circular shape for sandwiching hose 104 against the side of socket 100 and sealing hose 104 between provisions 110 and socket 100. Specifically, provisions 110 include an indentation for partially receiving hose 104 and socket 100 includes a seat for receiving the remaining portions of hose 104, with hose 104 being sandwiched between the indentation and the seat when mount 106 is secured to socket 100. In the preferred form, base 108 has a hollow interior and generally includes a bottom or outer wall 112 and a parallel spaced top or inner wall 114 of an annular shape. Pillars 116 are integrally formed with top wall 114 and are of a shape and configuration for at least partial slideable receipt in troughs 102 and have free ends for abutment with ears 98 on the opposite side than the shoulders of troughs 102. Mount 106 is suitably secured to recovery tank 90 such as by pin connectors 118 extending through base 108 and threaded into the lower wall of recovery tank 90. Access is available to pin connectors 118 when tank 90 is pivoted to its service position. With mount 106 secured to tank 90, base 108 seals the open end of socket 100 and ears 98 are sandwiched between the free ends of pillars 116 and the shoulders of troughs 102. In can then be appreciated that vacuum assembly 92 is secured against movement relative to tank 90 and that vacuum assembly 92 is simply sandwiched in position by socket 100 and mount 106 and specifically being free of connectors thereby reducing the number of components and for ease of assembly.

Top wall 114 includes a central opening for slideably receiving the free, lower end of motor 96 forming the drive of assembly 92 in a sealing relation. It should be appreciated that the lower end of motor 96 includes cooling apertures for passage of cooling air to the internal fan of motor 96. Base 108 includes an air entry portion 120 for allowing entry of air in the hollow interior of mount 106 from the center of the annular shape of tank 88 along a tortuous path. Specifically, in the most preferred form, a dam 122 extends between walls 112 and 114 and from the side wall of mount 106 intermediate an air entry 128 and the central opening of top wall 114. Thus, air or any other fluid is required to travel from entry 128 to motor 96 about a generally U-shape. In the most preferred form, entry 128 is arranged generally parallel to the leg of the U-shaped flow path around dam 122 so that air or other fluid is required to turn up to 90° to enter the U-shaped flow path around dam 122. It can then be appreciated that air entry portion 120 provides a first tortuous path into the hollow interior of mount 106 to generally prevent solutions sprayed into entry 128 from reaching the hollow interior of mount 106 but allowing entry of air.

The lower or bottom wall of recovery tank 90 which abuts with entry portion 120 includes a groove 130 of a generally U-shape extending from socket 100 above top wall 114 to an air port 131 in fluid communication with the center of the annular shape of tank 88. Specifically, groove 130 extends generally radially from the rotation axis of assembly 92, then turns 90°, then 90° in the same direction as the entry to groove 130, and in the most preferred form then at an angle of approximately 120° away from assembly 92. In the most preferred form, suitable gaskets can be supplied between mount 106 and recovery tank 90. It can then be appreciated that groove 130 provides a second tortuous path from socket 100 for allowing passage of air from the hollow interior of mount 106 through the free end of motor 96 and through motor 96 and into socket 100 on the opposite side of wall 114 than the hollow interior of mount 106 while generally preventing solutions sprayed into air port 131 from reaching the interior of socket 100.

According to the preferred teachings of the present invention, vacuum assembly 92 is generally sealed within socket 100 which is inset in tank 90. It can then be appreciated that the external noise generated by fan 94 and motor 96 is located in a closed space and is thereby deadened to the environment where scrubber 10 is being utilized. This deadening effect is further enhanced as solution fills tank 90 and encircles socket 100 to act as an additional layer of sound deadening material.

Additionally, vacuum assembly 92 is protected from water or other solutions. Specifically, due to its close proximity to scrubbing member 64, water and other solutions may be splashed toward vacuum assembly 92 when such solutions are being agitated by or otherwise encounter scrubbing member 64. Also, it is common for operators to clean scrubbers 10 by spraying them down with water. According to the preferred teachings of the present invention, socket 100 and mount 106 locate vacuum assembly 92 in a sealed environment which prevents passage of water and solutions to assembly 92 but allows air communication to and from both fan 94 and the internal cooling fan of motor 96.

In the most preferred form, drive lug 62 generally includes a generally cylindrical hub portion 132 for slideable receipt on and for rotation with the output or drive shaft of drive 60. A plurality of radially extending and circumferentially spaced fingers 134 integrally extend outward from the lower end of hub portion 132. Lug 62 further includes a cylindrical portion 136 of a diametric size larger than hub portion 132. In the most preferred form, cylindrical portion 136 has circular cross sections but it can be appreciated that other cross sectional shapes such as octagonal can be utilized. Fingers 134 integrally extend inward from the lower end of cylindrical portion 136. Thus, fingers 134 secure cylindrical portion 136 to hub portion 132 concentric to the drive shaft. An annular flange 138 integrally extends radially outward from the upper end of cylindrical portion 136 and is rotatable therewith. Thus, fingers 134 are axially spaced below flange 138. It should be appreciated that an annular trough is formed and defined by and between the inner surface of cylindrical portion 136 and the outer surface of hub portion 132, with the inner surface of cylindrical portion 136 being larger than the outer surface of hub portion 132. The trough is open at its upper end and includes openings at its lower end and defined by and between fingers 134. Lug 62 further includes a plurality of ears 140 integrally extending radially outward from cylindrical portion 136 and axially spaced below flange 138. It should be noted that scrubbing member 64 includes a central opening for receipt on the outer surface of cylindrical portion 136 and suitable cavities extending from the central opening for receipt of ears 140. Thus, scrubbing member 64 can be removably secured to lug 62 by any conventional manner such as a combination of sliding and rotating scrubbing member 64 relative to lug 62.

Scrubber 10 further includes suitable provisions for supplying solution from tank 88 to the trough of lug 62, with such provisions including a pipe 142 secured to the lower surface of motor mount 58 in the most preferred form. According to the teachings of the present invention, solution from tank 88 flows from tank 88 into the trough of lug 62 and specifically not on the back of scrubbing member 64. From the trough, the solution flows between fingers 134 onto the floor surface in the central opening of scrubbing member 64. It should then be appreciated that the trough of lug 62 receives, catches and holds the solution from pipe 142 for passage through the openings defined by fingers 134 and generally prevents the solution from traveling tangentially outwardly due to the rotation of lug 62 and scrubbing member 64. Thus, virtually all of the solution is generally introduced in the center of scrubbing member 64 and must travel to the outer periphery of scrubbing member 64 to maximize its residence time and operational use on the floor surface. Additionally, splashing of the solution resulting from the solution encountering a rotating scrubbing member 64 is minimized if not eliminated according to the preferred teachings of the present invention.

Scrubber 10 further includes provisions 144 for picking up solution from the floor surface. Provisions 144 generally includes a pivot bracket 146 suitably pivotably mounted to chassis 12 about a vertical axis perpendicular to the floor surface. A squeegee mount 148 is pivotably mounted to pivot bracket 146 about a horizontal mount axis perpendicular to the axis of pivot bracket 146 and parallel to and spaced from the floor surface. A gas spring 150 has a first end pivotably connected to pivot bracket 146 and a second end pivotably connected to squeegee mount 148 about axes which are parallel to and spaced from the horizontal pivot axis of squeegee mount 148. Provisions 144 further include a squeegee assembly 152 secured to the free end of mount 148 in the most preferred form with a removable and breakaway manner. A hose 154 extends and is in fluid communication between recovery tank 90 and squeegee assembly 152. Suitable provisions 156 such as a cable having a first end removably connected to mount 148 and a second end connected to an over center, pivotable handle can be provided for raising and holding squeegee assembly 152 above the floor surface.

It can then be appreciated that as scrubber 10 is moved along the floor surface, squeegee assembly 152 wipes the floor surface. With operation of vacuum assembly 92, air is drawn out of recovery tank 90 and is replaced with air drawn through hose 154 from squeegee assembly 152. As is well known, squeegee assembly 152 should be designed so that the air speed should be sufficient to entrain the solution and debris collected by squeegee assembly 152 for movement with the air through hose 154 and into recovery tank 90. Suitable provisions are provided so that the entrained solution and debris is separated from the air before it moves into fan 94.

Gas spring 150 according to the preferred teachings of the present invention biases mount 148 to pivot relative to bracket 146 to engage squeegee assembly 152 with the floor surface at a desired force for optimal operation of squeegee assembly 152. It should then be appreciated that as scrubber 10 moves over uneven floors, the pivotal position of mount 148 varies relative to bracket 146. As gas spring 150 is compressible at a constant rate independent of the position of the piston rod in the cylinder thereof, the force that squeegee assembly 152 is pushed against and engages the floor is also constant independent of the pivotal position of mount 148 about the mount axis and relative to bracket 146 and is not variable as in the case of springs. Also, squeegee provisions 144 do not have the bulkiness that would result if dead weight was utilized to bias squeegee assembly 152 against the floor surface.

Now that the basic teachings of the present invention have been explained, many extensions and variations will be obvious to one having ordinary skill in the art. For example, although scrubber 10 in the most preferred form includes several unique features and is believed to produce synergistic results, a surface cleaning machine could be constructed according to the teachings of the present invention utilizing such features individually or in other combinations. As an example, a wet/dry vacuum system could be constructed including socket 100 and mount 106 holding vacuum assembly 92 for connection to building current and which does not include provisions for introducing or agitating solution on the surface.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Machine for treating a floor surface comprising, in combination: a chassis for movement on the floor surface in a forward direction; a linkage plate pivotably mounted to the chassis about a linkage axis which is at an acute angle to the forward direction; a drive mount pivotably mounted to the linkage plate about a mount axis which is parallel to but spaced from the linkage axis; a drive mounted to the drive mount; a floor surface treating member removably secured to the drive for rotation thereby about a drive axis generally perpendicular to the floor surface, with the floor surface treating member having a diametric width about the drive axis, with the linkage plate, the drive mount, the drive, the floor surface treating member, and the chassis being arranged so that rotation of the floor surface treating member on the floor surface tends to assist the movement of the chassis on the floor surface in the forward direction, with the floor surface treating member having an opposite portion opposite the mount axis from the linkage axis and having an adjacent portion on the same side of the mount axis as the linkage axis; and means for biasing the drive mount to pivot about the mount axis in a direction to move the opposite portion of the floor surface treating member towards the floor surface and the adjacent portion of the floor surface treating member away from the floor surface and thereby engage the floor surface treating member in a cleaning pattern on the floor surface extending perpendicular to the forward direction over substantially the full diametric width of the floor surface treating member.

2. The machine of claim 1 wherein the mount biasing means comprises, in combination: an arm upstanding from the drive mount and having a free end, and a spring having a first end secured to the free end of the arm and a second end at a fixed position relative to the chassis, with the arm including an elongated slot defined by a plurality of fingers, with the force of the spring being adjustable by positioning the first end between different fingers of the elongated slot; and wherein the machine further comprises, in combination: means for biasing the linkage plate to pivot about the linkage axis towards the floor surface comprising, in combination: a rod pivotably connected to the linkage plate about an axis which is parallel to and spaced from the linkage axis; and a spring sandwiched between a stop on the rod and the chassis and for biasing movement of the rod relative to the chassis.

3. The machine of claim 2 further comprising, in combination: means for moving the linkage plate away from the floor surface and against the linkage plate biasing means.

4. The machine of claim 3 wherein the moving means comprises a lift lever pivotably mounted relative to the chassis about an axis and including a free end having an aperture, with the mount axis defined by a pin, with the pin being slideably and pivotably received in the aperture of the lift lever.

5. The machine of claim 1 wherein the chassis is moveable upon the floor surface by a pair of wheels mounted to the chassis about a horizontal axis and by at least a first caster.

6. The machine of claim 5 wherein the chassis comprises, in combination: a carrier, with the pair of wheels mounted to the carrier; a caster mount, with the caster secured to the caster mount; and a skirt, with the skirt secured to the carrier and to the caster mount, with the caster mount including an integral projection, with the linkage plate being pivotably mounted to the projection.

7. The machine of claim 6 wherein the skirt is molded from plastic and includes at least one wall, and a pocket extending from the at least one wall, with the pocket including a first plate extending parallel to the floor surface and a second plate extending generally perpendicular to the floor surface; and wherein the machine further comprises, in combination: a bumper wheel having a periphery and an axis, a U-shaped bracket having first and second legs extending parallel to each other and from a central portion, and a fastener extending through the first leg, the axis of the bumper wheel, and the second leg and secured to the first plate, with the central portion having a shape for flushly abutting with the second plate, with the periphery of the bumper wheel extending beyond the at least one wall, with the central portion transferring forces to the second plate in the event that the periphery of the bumper wheel engages an obstacle.

8. The machine of claim 1 wherein the chassis includes a bracket; and wherein the machine further comprises, in combination: a squeegee mount pivotably mounted to the bracket about a squeegee axis generally parallel to the floor surface, means secured to the squeegee mount for picking up solution from the floor surface, a gas spring having a first end pivotably mounted relative to the bracket and a second end pivotably mounted relative to the squeegee mount about axes parallel to and spaced from the mount axis to thereby engage the solution picking up means with the floor surface at a force which is constant independent of the pivotal position of the squeegee mount about the squeegee axis.

9. The machine of claim 8 further comprising, in combination: a recovery tank mounted to the chassis; means for providing fluid communication between the recovery tank and the solution picking up means; and a vacuum system for placing the recovery tank under vacuum comprising, in combination: a vacuum assembly including an inlet and an outlet for passage of air and including a vacuum drive having a free end, a socket of a size for receipt of the vacuum assembly and having a socket wall and an open end, with the inlet of the vacuum assembly passing through the socket wall in a sealed manner to generally prevent entry of solution into the socket around the inlet, with the outlet passing through the open end of the socket, an assembly mount of a size for closing the open end of the socket in a sealed manner to generally prevent entry of solution into the socket through the open end and around the outlet, and means for removably securing the assembly mount to the socket.

10. The machine of claim 1 further comprising, in combination: a drive lug for removably connecting the floor surface treating member to the drive; wherein the drive lug comprises, in combination: a hub portion for receipt on and for rotation with the drive, a cylindrical portion of a diametric size larger than the hub portion, means for securing the cylindrical portion to the hub portion concentric to the drive and defining at least one opening, an annular flange extending radially outwardly from the cylindrical portion and rotatable therewith, and a plurality of ears integrally extending radially from the cylindrical portion and axially spaced from the flange.

11. The machine of claim 1 further comprising, in combination: first and second batteries each having a positive terminal and a negative terminal, with the first and second batteries being carried by the chassis; a harness connector powering the drive; a first connector having a first terminal connected to the positive terminal of the first battery and having a second terminal connected to the negative terminal of the first battery; a second connector for removable electrical connection to the first connector without the use of tools and having a first terminal connected to the negative terminal of the second battery and having a second terminal; and a third connector for removable electrical connection to the harness connector without the use of tools and having a first terminal connected to the positive terminal of the second battery and having a second terminal connected to the second terminal of the second connector.

12. The machine of claim 1 wherein the mount biasing means comprises, in combination: an arm upstanding from the mount and having a free end and a spring having a first end secured to the free end of the arm and a second end at a fixed position relative to the chassis.

13. The machine of claim 12 wherein the arm includes an elongated slot defined by a plurality of fingers, with the force of the spring being adjustable by positioning the first end between different fingers of the elongated slot.

14. The machine of claim 1 further comprising, in combination: means for biasing the linkage plate to pivot about the linkage axis towards the floor surface.

15. The machine of claim 14 wherein the linkage plate biasing means comprises, in combination: a rod pivotably connected to the linkage plate about an axis which is parallel to and spaced from the linkage axis; and a spring sandwiched between a stop on the rod and the chassis and for biasing movement of the rod relative to the chassis.

\* \* \* \* \*